Sept. 11, 1951 L. E. CARSON 2,567,508
FASTENER
Original Filed Dec. 4, 1944 2 Sheets-Sheet 1
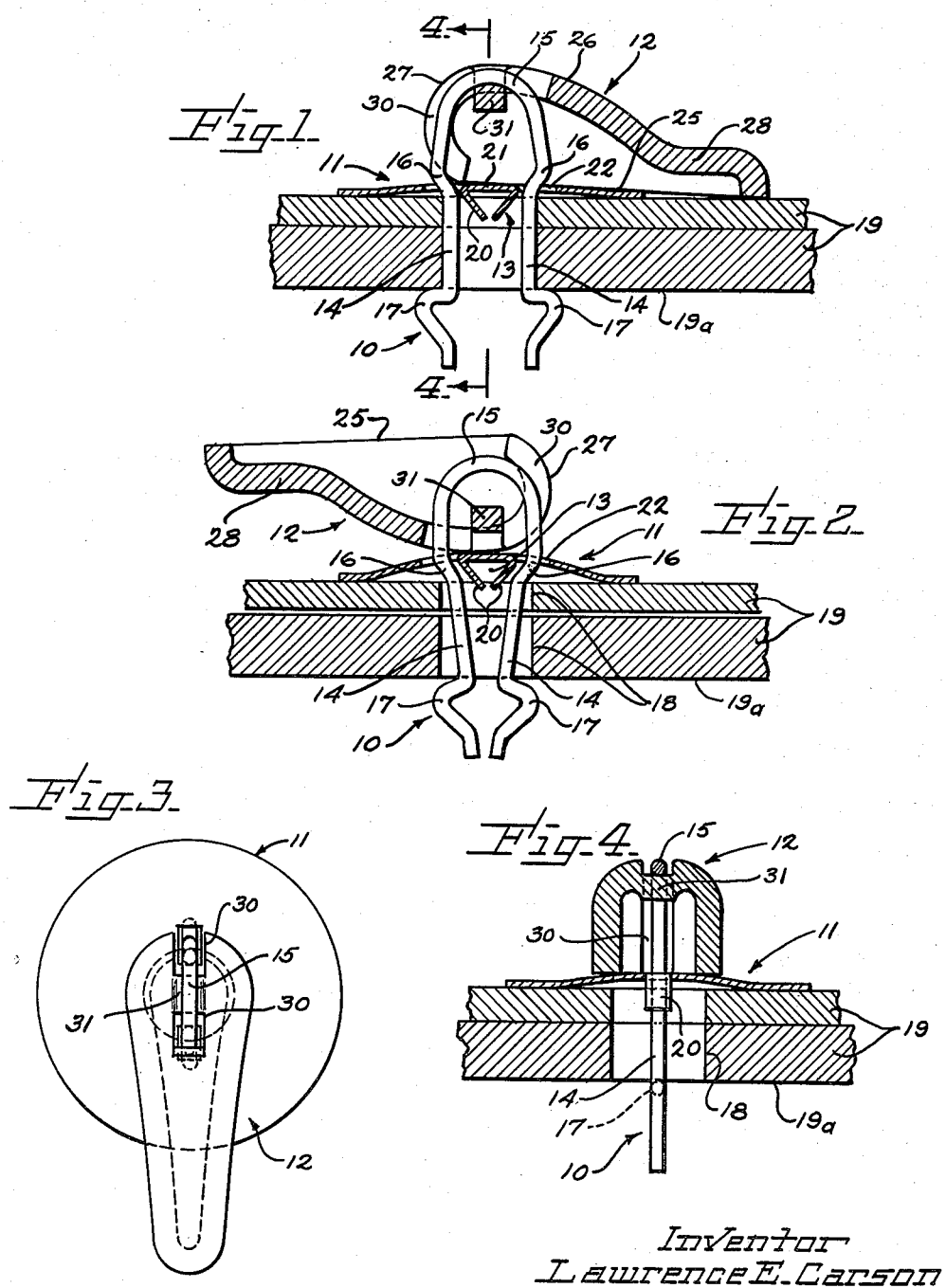
Inventor
Lawrence E. Carson
Burkelew & Sawtlebury
Attys.

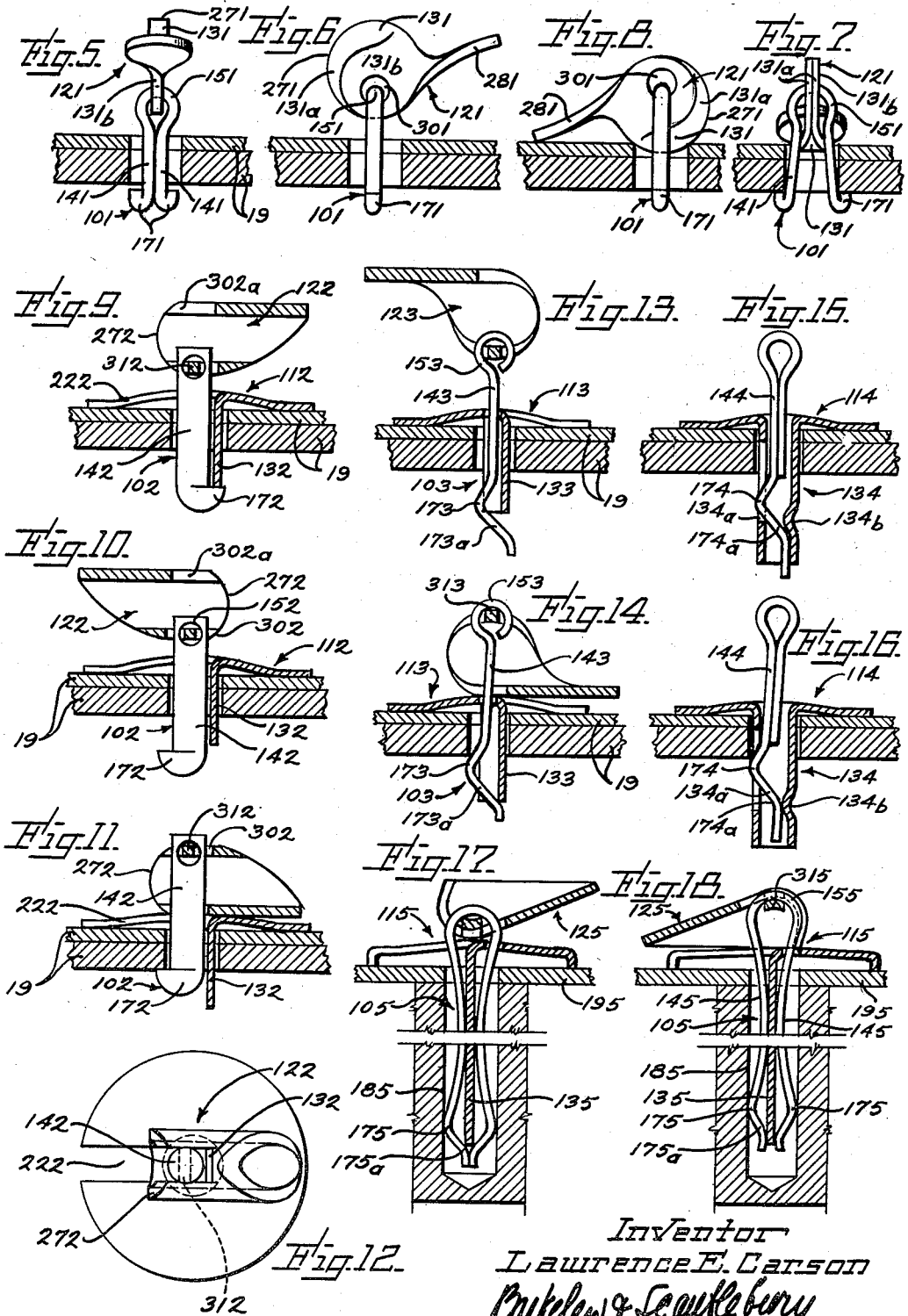

Patented Sept. 11, 1951

2,567,508

UNITED STATES PATENT OFFICE 2,567,508

FASTENER

Lawrence E. Carson, Alhambra, Calif.

Continuation of application Serial No. 566,413, December 4, 1944. This application December 19, 1947, Serial No. 792,787

5 Claims. (Cl. 85—5)

This invention relates to fasteners adapted to be quickly and easily applied and released; and although, as shown in the accompanying drawings and described herein, the fastener is particularly adapted and designed to be used for temporarily securing parts together, it may also be used as a permanent fastener, or as an anchor or the like to which something else may be attached.

The general object of the invention is to provide a fastener of the type indicated, of extreme simplicity and high effectiveness, coupled with ease and simplicity of manipulation and low manufacturing cost. Other characteristic features of the invention will be best understood from a consideration of various typical forms which my fastener may take and which are illustrated in the accompanying drawings in which Fig. 1 is a sectional view of one preferred form of fastener, showing it as used for securing two sheets or plates together;

Fig. 2 is a similar view showing the fastener released;

Fig. 3 is a plan of the fastener in the position of Fig. 1;

Fig. 4 is a section on line 4—4 of Fig. 1;

Fig. 5 is an end elevation and Fig. 6 is a side elevation of another form of fastener in its released position, Figs. 7 and 8 being similar views showing that fastener in its applied position;

Figs. 9, 10 and 11 are sectional views showing another form of the fastener in its several positions of application and release;

Fig. 12 is a plan of the fastener shown in Fig. 10;

Figs. 13 and 14 are sectional views showing another form of the fastener in its positions of release and application;

Figs. 15 and 16 are sectional views showing a modification of a fastener of the type of Figs. 13 and 14, and Figs. 17 and 18 are sectional views showing a modified form of fastener adapted to be secured or anchored in a bore.

Referring first to Figs. 1 to 4, the form of fastener which is there shown is composed fundamentally of three parts; an expansive anchor 10, a base 11 and a camming member 12. As in several of the different forms shown in the drawings, anchor member 10 is made in a general U-formation, of resilient wire or other suitable material, and preferably prestressed to take normally the collapsed position shown in Fig. 2. As is also common to several of the other forms illustrated, base 11 is formed of a resilient metal, pre-stressed like a spring washer to take normally the sectionally curved configuration shown in Fig. 2. This spring base is substantially flat in conformation, is of the nature of and acts like a leaf spring, and when resiliently compressed in thickness may be completely flat. This spring washer carries the anchor deflecting member which, in this case, is in the form of a wedge 13 lying between the legs of the U-shaped anchor. The general function of camming member 12 is, relatively, to lift anchor 10 from such a position as shown in Fig. 2 to that of Fig. 1, and to press base 11 and the anchor deflecting member 13 down relatively, from the position shown in Fig. 2 to the position shown in Fig. 1. As shown in Fig. 1, and as is common to all forms, the camming member bears directly on the flat spring base.

In preferred detail, anchor member 10, of general U-shape, has two legs 14 extending from head portion 15, the legs near the head being bent outwardly as shown at 16 to accommodate the wedge 13 when the parts are in the released position of Fig. 2. In that position legs 14 converge inwardly toward each other, so that the lateral projections—shoulder forming projections 17—at or near the ends of the two legs may be readily passed into or through the opening or openings 18 in the one or more sheets or plates of other members 19 which the fastener is designed to secure together, or to which the fastener is to be secured.

In preferred form, base 11 may be circular in plan, and wedge 13 formed by punching out two wedge forming lips 20 which are bent down and angularly toward each other and under a central web 21 which lies between the two openings 22 from which the lips have been punched. Anchor legs 14 extend through those punched-out openings.

Camming member 12 is preferably made in substantially the configuration shown in the drawing, and may be hollow, as illustrated, although not necessarily so. It is provided on one side with a flat face 25, adapted to press and rest flatly on base washer 11 when the parts are in the position of Fig. 1. Extending around one end, and merging with the face 26 which is opposite face 25, the camming member has a camming surface 27 which may be generally circular in form. The particular form and design of end portion 28 of the camming member, opposite the camming end 27, is of no critical consequence, although a design like that shown in the drawings is preferred for reasons which will be pointed out. Member 12 is provided in its cam end with a longitudinal slot 30 which is crossed by a slot bridging web 31, preferably in about the relative position and configuration illustrated. The web is preferably integral with the body of the camming member; the whole member may be made of formed metal or of a plastic molding. And preferably web 31 lies in such an inwardly recessed position, with relation to camming surface 27 and top surface 26 that, when the parts are in the position shown in Fig. 1 the head portion 15 of anchor 10 does not project materially above the top surface of the camming member. That provision, and the illustrated configuration of the camming member, provide that the whole device in the position of Fig. 1 shall make a minimum projection above the surface of 19 and also a projection which forms a smoothly rounded protuberance.

When the fastener is to be applied, the parts are put into some such position as shown in Fig. 2, with camming member 12 thrown over to the position there shown. In that general relative position of the parts, the contracted anchor 10 is pressed into or through openings 18; and normally it may be pressed further into the openings than is shown in Fig. 2, until head portion 15 rests on web 31. Then, as camming member 12 is thrown over toward the right, web 31 rises under head 15, first lifting the head to some such position as shown in Fig. 2. Further upward movement of the anchor then brings the leg portions 16 into contact with wedge 13 and expands the anchor to the relative position shown in Fig. 1 with its shoulders 17 either out against the wall of an opening 18, or expanded under the inside or lower face 19a of a part 19. Further movement of camming member 12 pulls the anchor relatively upwardly until, for instance, shoulder portions 17 engage face 19a. After shoulders 17 have engaged face 19a, further and final movement of the camming member presses spring base 11 down from the position of Fig. 2 to the position of Fig. 1, pressing wedge 13 down toward or between the straight portions 14 of the anchor legs. In the final position, the flat lower face 25 of the camming member rests upon base 11, which has been relatively flattened out, and web 31 is located centrally of the anchor head 15 and centrally over wedge 13. And it will be noted that the flat bottom face 25 extends under web 31, so that the device is self-locking in the position of Fig. 1.

The resilient compressibility of base 11 allows for a substantial variation in the total thickness of the plate or plates 19 which any given fastener will take. The fasteners may be manufactured to take different thicknesses, simply by providing anchor members with different leg lengths, in increments of some suitable dimension, say 1/8". And then the resilient compressibility of base 11 takes care of variations within that 1/8" or so.

The anchor member and the cam member may take various forms. Figs. 5 to 8 illustrate some of the variations. There the anchor member 101 is again of general U-shape, but with its legs 141 lying close together when the anchor member is laterally collapsed, which is preferably its prestressed normal condition. The member has a head in the form of an eye 151, and its lateral shoulder extensions at the ends of its legs are formed as shown at 171 by doubling back the ends of the legs.

Cam member 121 has a body which is generally circular, as shown in Figs. 6 and 8, and bounded by the circular cam surface 271. A manipulting handle 281 projects from the body. The body is generally in the form of a flat disk with an aperture at 301 through which the anchor eye 151 extends, this aperture being eccentric to the circle of the body as shown in Figs. 6 and 8. The part of the circular body which is furthest removed from aperture 301 is thickened, as illustrated at 131 (Fig. 7); and the sides of the body around camming edge 271 are provided with beveled edges 131a which slope outwardly to the faces of thickened portion 131 as is illustrated in Fig. 7.

When camming member 121 is rotated from the position shown in Figs. 5 and 6, to the position shown in Figs. 7 and 8, the bevel-edged thinner part of the body 131b first enters between the contracted legs 141; and then as the camming member is swung further around, the thicker part of the camming member wedges the legs further apart to the position shown in Fig. 7 at the same time that the camming member, riding on the upper surface of 19 (or on a washer base such as has been described) raises the legs to the clamping position shown in Figs. 6 and 7.

Figs. 9 to 12 show another modification which differs mainly from Fig. 1 by having its anchor member in the form of a single rod or pin 142 which has a laterally offset shoulder head 172 on one side of its lower end. Its upper end has the aperture or eye 152 which takes a transverse web 312 that bridges the slot 302 in one of the walls of a tubular camming member 122. The opposite wall of this tubular member is provided with a corresponding slot 302a, and the slotted end of the member is formed with the curved camming face 272 as shown.

Spring base 112 is generally similar to the spring base 11 described in connection with Fig. 1, but instead of having an anchor spreading wedge, it has an anchor deflecting or displacing tongue 132 which extends down along one side of anchor leg 142. Tongue 132 is punched out of the washer material, forming the slot 222, through which anchor leg 142 extends. With the parts in the position shown in Fig. 9 the anchor may be inserted through the opening or openings in 19. Then by turning the anchor and camming member to the position shown in Fig. 10 the anchoring shoulder 172 is turned to a position under the lower face of 19. Then, by throwing the camming member over, the anchor member is first drawn up until shoulder projection 172 engages the under face of 19; and the final action is to resiliently compress the spring washer 112.

Figs. 13 and 14 show a form which is similar to that of Fig. 9, differing mainly in the form of the anchoring member. In essentials, the camming member 123 of Fig. 13 is substantially the same as in Fig. 9 and need not be described in detail; and also in essentials the spring washer base 113 is substantially the same except that its downwardly projecting deflecting member 133, instead of being merely or essentially a flat tongue as in Fig. 9, is perfectly semi-cylindric so as to partially encompass the anchor member 103. In this form the anchor member has an eye 153 at its upper end which takes the bridge web 313 of the camming member. At its lower end the anchor leg 143 has a shoulder-forming projection 173 and then, below that shoulder-forming projection, the lower end of the leg is extended downwardly and diagonally, as shown at 173a, to project laterally to that side of leg 143 which is opposite the shoulder-forming projection 173.

As the camming member is thrown from the position of Fig. 13 to the position of Fig. 14 the anchor member is drawn upwardly and the diagonal portion 173a is wedged over to the left by the displacement tongue 133. Shoulder 173 is thus moved laterally to a position under the face of 19; and then as resilient washer base 113 is finally compressed, the relative downward movement of 133 tends to move 173 over toward the left more tightly and solidly into engagement with 19. The lateral wedging action of the single leg anchor of Figs. 13 and 14 is thus analogous to the corresponding actions of the double leg anchor of Fig. 1. The leg is first wedged laterally as it is drawn up under the lower face of 19; and then the leg displacing member is moved down in further wedging relation to the leg as the resilient base is compressed.

Figs. 15 and 16 show an anchor and base formation which may be used, for instance, with any of the camming members shown in Figs. 1, 5, 9 or 13. The spring washer base 114 is similar to that of Figs. 13 and 14, except that its downwardly extending anchor displacement member 134 is in full tubular form with a slot 134a at one side through which the shoulder-forming projection 174 may project. The anchor leg 144 has a lateral camming projection 174a below the anchoring shoulder 174, similar in general formation to 173a of Fig. 13. But here, instead of the anchor member being wedged over toward the left by being raised into engagement with the end of the displacement member (as with the end of 133 in Fig. 14) the tubular member 134 is provided with an interior wedging projection 134b. The general action is similar to that of Figs. 13 and 14, as will be understood without further detailed description.

Without the necessity of specific illustration, it will be understood how any of the forms in which the anchor member is wedged laterally, may be wedgingly anchored in a hole. For instance in the form of Figs. 1 and 2 if 19 were to be considerably thicker, and the hole or holes 18 suitably larger so that in the position of Fig. 2 the anchor portions 17 would lie within the hole, then the outward wedging action which takes place as the parts are thrown to the position of Fig. 1 would wedge the projection 17 outwardly against opposite walls of the hole. And in Figs. 13 and 15, under similar conditions, the projection 173, or 174 would be wedged laterally against a wall of such a hole. Applied in such a manner, the fasteners may be used as anchors for securing any article to or against a wall or other structure, or as anchors to which wires, etc. may be attached. Figs. 17 and 18 show a double legged form of anchor applied to anchorage within a hole, and illustratively utilized for securing a plate or sheet 195 to any structure which has the anchoring hole 185 in it.

The particular form of fastener which is shown in Figs. 17 and 18 is analogous both to the form shown in Fig. 1 and those shown in Figs. 13 and 15; in that the anchor member itself is double legged and that the wedging or displacement member preferably extends downwardly between the legs and has its wedging action on the latter at or near their lower ends. The anchor member 105 is again of general U-shape with a head portion 155 hanging on the bridging web 315 of camming member 125. The camming member is essentially like that which has been described in connection with Fig. 1. The legs 145 are preferably bowed inwardly toward each other as illustrated, and a relatively long deflecting or wedging tongue 135 depends between them from the base 115. This base may or may not have the resilient compressibility which has been before described; and if it has resilient compressibility that need not be as large as is desirable when the fastener is acting between two opposite faces of sheets or plates.

Near their lower ends the anchor legs have the anchoring projections 175, and below 175 the leg ends are bent inwardly as at 175a to form wedging faces to cooperate with the lower end of tongue 135. The action of this form of fastener will be apparent from what has been said and from Figs. 17 and 18. The lower ends of the legs are spread and projections 175 forcibly engage the hole walls as the anchor is drawn up onto tongue 135. If base 115 is resiliently compressible it may give under compression just before the leg ends 175a, in their upward movement in the hole, reach the fully expanded condition shown in Fig. 18. The final movement of camming member 125 then flattens base 115 and forces tongue 135 down between the then stationary legs, forcing lugs 175 more tightly into engagement with the hole walls. If base 115 is not compressible then the legs reach their final position with reference to tongue 135 by upward movement of the legs in the hole.

A fastener of the general form of Figs. 17 and 18 — that is, with the leg spreading action at or near the lower ends of the legs — is particularly useful in securing together thick plates, or sheets or plates which are spaced apart. Of course, for thick, or spaced plates, the legs of any of the described forms can be appropriately lengthened; but if the legs are very long it is advantageous to have the leg spreading or deflecting action at or near the end.

The specific structures that have been described, referring particularly to the inclusion of a base member which is resiliently compressible in thickness, represent illustrative preferred embodiments of the invention. However, as has already been pointed out in relation to Figs. 17 and 18; the base member can also be of a non-resilient type, the inherent resiliency of other parts of the structure such as the anchor legs then providing sufficient flexibility to compensate for small dimensional variations in the work. The added resilience of the spring type base is preferred in general, for the reasons already discussed.

This application is a continuation of my previous application Serial 566,413, now abandoned, filed December 4, 1944. Reference is made to my copending application Ser. 698,625, filed September 23, 1946, now Patent No. 2,514,692, dated July 11, 1950, in which the specific form of fastener shown in Figs. 5 to 7, inclusive, is made a part of the subject-matter. Claims specifically directed to that form of the fastener are made in that application and not here.

I claim:

1. A fastener including in combination an anchor comprising a leg adapted to be inserted endwise in an opening which extends inwardly from an outer face of a plate or the like and having an anchoring formation at its inner insertible end and a head at its outer end, an anchor moving cam directly rotatably mounted on the head and having a cam face eccentric to the axis of rotation on the head, and a substantially flat resilient base surrounding the leg adapted to lie flatly against the face of the plate or the like, adapted to be resiliently compressed in effective thickness by being pressed against the plate, but being substantially non-distortible in its own plane, locating means adapted to extend into the opening in the plate and to limit movement of the base transversely of the opening in one direction, the leg and the base having cooperating wedging portions which act to wedge the leg transversely of the opening in the opposite direction into anchoring position in the opening by reason of relative longitudinal movement between the leg and the base, said cam being adapted by rotation to press directly against the base to compress the base inwardly against the plate face and to exert longitudinal tension on the leg to move it outwardly longitudinally with reference to the base and thereby to wedge the leg transversely into anchoring position in the opening.

2. A fastener comprising in combination an anchor member substantially of elongate U-shape whose legs are adapted to be inserted endwise in an opening which extends inwardly from an outer face of a plate or the like, said anchor member having anchoring formations at the inner insertible ends of its legs, an anchor moving cam directly rotatably mounted on the leg-connecting portion of the U-shaped anchor and adapted to rotate in a plane which is parallel to the plane of the U-formation, said cam having a cam face which is eccentric to the axis of rotation of the cam, and a substantially flat spring base lying inwardly of the cam, surrounding the anchor legs and adapted to lie against the outer face of the plate or the like, the spring base being provided with a leg spreading wedging member lying between the anchor legs, and the legs having cooperative wedging formations, whereby the legs are spread when they are moved outwardly with relation to the base, said cam being adapted by rotation to press inwardly on the spring base to compress the base inwardly in effective thickness and to move the anchor outwardly with reference to the base.

3. A fastener comprising in combination an anchor member substantially of elongate U-shape whose legs are adapted to be inserted endwise in an opening which extends inwardly from an outer face of a plate or the like, an anchor moving cam directly rotatably associated with the leg-connecting portion of the U-shaped anchor and adapted to rotate in a plane parallel to the length of the anchor and having a cam face eccentric to its axis of rotation, a substantially flat resilient base surrounding the anchor legs inwardly of the cam, adapted to lie flatly against the outer face of the plate or the like, adapted to be resiliently compressed in effective thickness by being pressed against the plate, but being substantially non-distortible in its own plane, the resilient base having a leg spreading wedging formation lying between the anchor legs, and the legs having cooperative wedging formations, whereby rotation of the cam presses inwardly on the base to compress it inwardly and moves the anchor outwardly with reference to the base and the anchor legs are spread.

4. A fastener as defined in claim 3 and in which the base is a substantially flat base plate having apertures therein through which the anchor legs extend, at least one of said apertures being formed by folding portions of the base plate out of the plane of the plate, and in which the said leg spreading wedging formation comprises the said folded portion of the base plate.

5. A fastener comprising in combination an anchor member substantially of elongate U-shape whose legs are adapted to be inserted endwise in an opening which extends inwardly from an outer face of a plate or the like, a housing adapted to enclose substantially completely that portion of the anchor member that protrudes outwardly from the opening, the said housing being elongated and having a substantially flat longitudinal face extending substantially its entire length, a generally cylindrical camming face at one end of the housing extending through about 180° and having one end substantially tangent to the flat face, the other end of the housing comprising a handle formation, a slot substantially bisecting the camming face in a plane normal to the flat face of the housing, and a bridge across the slot adjacent the other end of the camming face, the leg-connecting portion of the anchor member lying in the plane of, and substantially within, the said slot adjacent the bridge with one of the anchor legs extending on each side of the bridge, a substantially flat and relatively thin base surrounding the anchor legs inwardly of the housing and adapted to lie against the outer face of the plate or the like when the anchor legs are inserted in the opening, the base carrying a wedging formation lying between the anchor legs, and the legs carrying cooperating wedging formations whereby the anchor legs are spread by longitudinal movement of the base toward the ends of the legs, the housing being rotatable relative to the anchor member about the bridge as an axis between an anchor releasing position with the anchor legs relatively extended from the housing and an anchor securing position with the anchor legs relatively withdrawn into the housing, and with the base lying flatly against the flat face of the housing and pressed thereby longitudinally of the legs to spread them into anchoring position in the opening, and with the handle formation lying flatly against the outer face of the plate or the like.

LAWRENCE E. CARSON.

REFERENCES CITED

The following references are of record in the file of this patent:

UNITED STATES PATENTS

| Number | Name | Date |
| --- | --- | --- |
| 228,697 | Thompson | June 8, 1880 |
| 1,434,345 | Johnson | Oct. 31, 1922 |
| 2,230,769 | Tegerdine | Feb. 4, 1941 |
| 2,321,518 | Rossmann | June 8, 1943 |